(12) United States Patent
Park et al.

(10) Patent No.: US 9,594,945 B2
(45) Date of Patent: Mar. 14, 2017

(54) METHOD AND APPARATUS FOR PROTECTING EYESIGHT

(71) Applicant: Samsung Electronics Co., Ltd., Gyeonggi-do (KR)

(72) Inventors: Jeong-Hoon Park, Gyeonggi-do (KR); Dong-Wook Kwon, Gyeonggi-do (KR); Kyung-Il Kim, Gyeonggi-do (KR); Min-Ho Kim, Gyeonggi-do (KR); Gi-Sang Lee, Gyeonggi-do (KR); Sang-Bo Lee, Gyeonggi-do (KR); Jin-Kyung Lee, Gyeonggi-do (KR); Young-Gu Jin, Gyeonggi-do (KR); Jin-Wuk Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 184 days.

(21) Appl. No.: 14/293,508

(22) Filed: Jun. 2, 2014

(65) Prior Publication Data

US 2014/0355830 A1    Dec. 4, 2014

(30) Foreign Application Priority Data

May 31, 2013    (KR) .......................... 10-2013-0062414

(51) Int. Cl.
*G06K 9/00* (2006.01)
*G06F 3/01* (2006.01)
(Continued)

(52) U.S. Cl.
CPC ........... *G06K 9/00228* (2013.01); *G06F 3/01* (2013.01); *G06K 9/00604* (2013.01); *G09G 3/20* (2013.01);
(Continued)

(58) Field of Classification Search
None
See application file for complete search history.

(56) References Cited

U.S. PATENT DOCUMENTS 5,355,180 A    10/1994 Back
9,075,435 B1 *  7/2015 Noble ...................... G06F 3/013
(Continued)

FOREIGN PATENT DOCUMENTS

EP    2 130 571    12/2009
EP    2 477 183    7/2012
(Continued)

OTHER PUBLICATIONS

Z Qian et al., "Precise Eye Detection on Frontal View Face Image," ICIMCS '09 Proceedings of the First International Conference on Internet Multimedia Computing and Service, pp. 43-48, 2009.*
(Continued)

*Primary Examiner* — Matthew Bella
*Assistant Examiner* — Soo Shin
(74) *Attorney, Agent, or Firm* — The Farrell Law Firm, P.C.

(57) ABSTRACT

A method and an apparatus for controlling a display in order to secure an appropriate viewing distance between a digital device and a user who is viewing the digital device is provided. Accordingly, the method determines whether an object exists within a hazardous viewing distance using a 3D camera function provided in the digital device. If it is determined that an object exists within the hazardous viewing distance, the digital device detects a face or eyes from 2D images photographed by the camera. Next, the direction of the face is determined on the basis of the detected results, and it is determined whether a user is viewing a display screen of the digital device based on the determination. If it is determined that a user is viewing a display screen of a digital device, the digital device generates a warning that the user is positioned within a hazardous viewing distance.

20 Claims, 7 Drawing Sheets

(51) Int. Cl.
*G09G 3/20* (2006.01)
*G09G 5/10* (2006.01)
*H04N 13/00* (2006.01)
*H04N 13/02* (2006.01)
*H04N 13/04* (2006.01)

(52) U.S. Cl.
CPC ........... *G09G 5/10* (2013.01); *H04N 13/0033* (2013.01); *H04N 13/0239* (2013.01); *G09G 2354/00* (2013.01); *H04N 13/0285* (2013.01); *H04N 13/0468* (2013.01); *H04N 2213/002* (2013.01)

(56) References Cited

U.S. PATENT DOCUMENTS

| | | | | |
|---|---|---|---|---|
| 2011/0032118 | A1* | 2/2011 | Robaz | B60Q 9/008 340/902 |
| 2011/0052009 | A1 | 3/2011 | Berkovich et al. | |
| 2011/0090318 | A1* | 4/2011 | Chen | H04N 13/026 348/50 |
| 2011/0279277 | A1* | 11/2011 | Li-Chung | G06Q 10/109 340/573.7 |
| 2012/0146898 | A1* | 6/2012 | Lin | H04N 21/4432 345/157 |
| 2012/0210277 | A1 | 8/2012 | Bowen et al. | |
| 2012/0218179 | A1* | 8/2012 | Oba | H04N 21/4223 345/156 |
| 2012/0229377 | A1* | 9/2012 | Kim | G06F 3/017 345/157 |
| 2013/0322863 | A1* | 12/2013 | Lee | H04N 5/23212 396/125 |
| 2014/0191948 | A1* | 7/2014 | Kim | H04N 5/4403 345/156 |
| 2014/0285436 | A1* | 9/2014 | Wu | G06F 3/013 345/156 |
| 2015/0271567 | A1* | 9/2015 | Michot | H04N 21/4312 348/47 |
| 2015/0288883 | A1* | 10/2015 | Shigeta | G06F 3/011 345/642 |

FOREIGN PATENT DOCUMENTS

| | | | |
|---|---|---|---|
| IT | EP 0929196 A1 * | 7/1999 | ............. G08B 21/18 |
| JP | 2003-087632 | 3/2003 | |
| JP | 2007-158787 | 6/2007 | |
| JP | 2009-134216 | 6/2009 | |
| JP | 2012-088497 | 5/2012 | |
| KR | 1019870004617 | 5/1987 | |
| KR | 1019870010739 | 11/1987 | |
| KR | 1019880001152 | 3/1988 | |
| KR | 1019980004691 | 6/1988 | |
| KR | 1019930015740 | 7/1993 | |
| KR | 1019960012976 | 4/1996 | |
| KR | 1019960036570 | 10/1996 | |
| KR | 1019960043801 | 12/1996 | |
| KR | 1019980031371 | 7/1998 | |
| KR | 1019990031446 | 5/1999 | |
| KR | 1019990041088 | 6/1999 | |
| KR | 1019990064360 | 7/1999 | |
| KR | 1020000004051 | 1/2000 | |
| KR | 1020010019032 | 3/2001 | |
| KR | 1020010035034 | 5/2001 | |
| KR | 1020010073949 | 8/2001 | |
| KR | 1020060005239 | 1/2006 | |
| KR | 1020080064632 | 7/2008 | |
| KR | 100912137 | 8/2009 | |
| KR | 1020110118323 | 10/2011 | |

OTHER PUBLICATIONS

European Search Report dated Mar. 24, 2015 issued in counterpart application No. 14170728.1-1904.
European Search Report dated Aug. 3, 2016 issued in counterpart application No. 14170728.1-1904, 13 pages.

\* cited by examiner

METHOD AND APPARATUS FOR PROTECTING EYESIGHT

PRIORITY

This application claims priority under 35 U.S.C. §119(a) to Korean Patent Application Serial No. 10-2013-0062414, filed in the Korean Intellectual Property Office on May 31, 2013, the entire content of which is incorporated herein by reference.

BACKGROUND OF THE INVENTION

1. Field of Invention

The present disclosure relates generally to a digital device for an image display, and more particularly, to a method and an apparatus for protecting eyesight by which an appropriate viewing distance of users can be secured.

2. Description of Related Art

In recent years there has been a trend of televisions becoming bigger, however, viewing spaces are often too small to accommodate large-sized televisions. Further, with the widespread availability and use of digital televisions, people spend much of their leisure time watching television.

In addition, as various portable devices are developed, the various portable devices provide services such as a movie reproduction service, a DMB service, an Internet network searching service, or the like, which has brought about an increase in time that people spend watching portable devices.

With the increase in time spent watching digital televisions and portable devices, users are facing a deterioration of eyesight. Particularly, in the case of portable devices, the user's eyesight may become worse due to features of the portable devices which allows users to watch anytime and anywhere.

SUMMARY

The present disclosure has been made to address at least the problems and disadvantages described above, and to provide at least the advantages described below. Accordingly, an aspect of the present disclosure is to provide a method and an apparatus for protecting a user's eyesight.

Another aspect of the present disclosure is to provide a method and an apparatus for controlling a display in order to secure an appropriate viewing distance between a digital device and a user who is viewing the digital device.

In accordance with an aspect of the present disclosure, a method for protecting eyesight in an image output digital device is provided. The method includes detecting an object in a photographed 3D image, based on a configuration of an eyesight protecting mode, detecting a distance between the detected object and the digital device, and when the detected distance is within a reference distance, detecting a face or eyes in a photographed 2D image of the object, and when the face or eye of a user are detected in the photographed 2D image, determining whether the user remains within the reference distance, based on the results of the face or eyes detection, determining whether the user is viewing a display panel of the digital device, based on the results of the face or eye detection, and when it is determined that the user remains within the reference distance and is viewing the display panel, generating a warning.

In accordance with another aspect of the present disclosure, an image output digital device is provided. The digital device including a display panel, a camera that is mounted on a same surface as the display panel, a controller that detects an object in a photographed 3D image, based on configuration of an eyesight protecting mode, detects a distance between the detected object and the digital device, and when the detected distance is within a reference distance, detects a face or eyes in a photographed 2D image of the object, and when the face or eyes of a user are detected in the photographed 2D image, determines whether the user remains within the reference distance, based on the results of the face or eyes detection, determines whether the user is viewing a display panel of the digital device, based on the results of the face or eyes detection, and when it is determined that the user remains within the reference distance and is viewing the display panel, generates a warning.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Hereinafter, the embodiments of the present disclosure will be described in detail with reference to the accompanying drawings. It should be noted that the same reference numerals and symbols denotes the identical structural elements although the structural elements may be depicted in another drawing. Further, in the description of the present disclosure, when it is determined that the detailed description of the related well-known functions or structures may cause confusion in the subject matter of the present disclosure, the description will be omitted.

The embodiments of the present disclosure may be applied to various digital devices adopting a display screen for displaying images. For example, embodiments of the present disclosure may be applied to various digital devices such as smart phones, PDAs, multimedia players, tablet PCs, notebooks, portable game players, and the like. In addition, embodiments of the present disclosure may be applied to digital devices such as desktop PCs, digital televisions, monitor devices, and the like.

Hereinafter, for an understanding of the present disclosure, an example of a portable device applied with the present disclosure, and another example of a television set applied with the present disclosure will be described, respectively.

Figure 1:
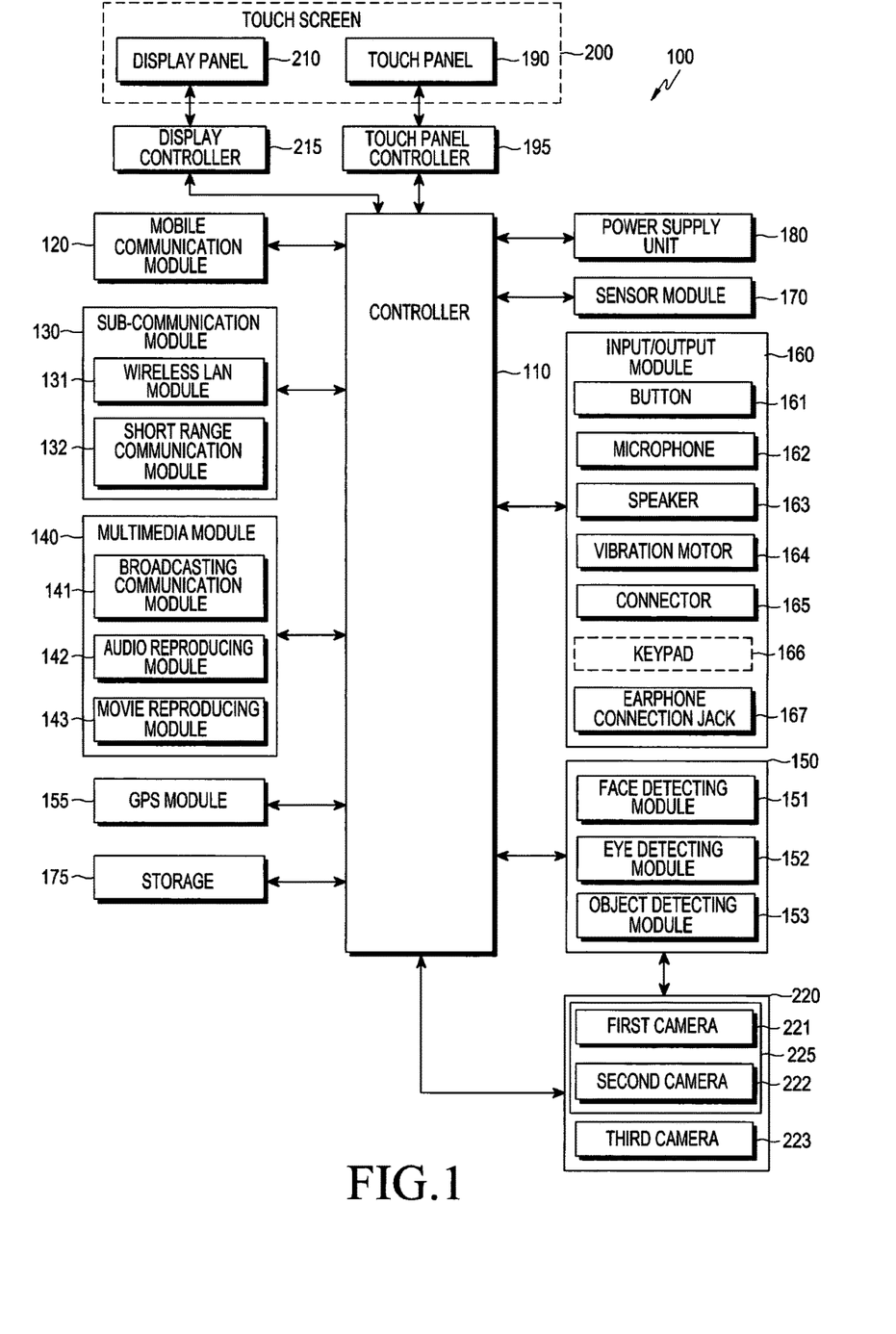
FIG. 1 is a block diagram illustrating a configuration of a portable device according to an embodiment of the present disclosure.

FIG. 1 is a block diagram illustrating a configuration of a portable device according to an embodiment of the present disclosure.

Referring to FIG. 1, a portable device 100 may be, for example, a mobile phone, a smart phone, a multimedia player, a tablet PC, a notebook, a portable game player, or the like. Referring to FIG. 1, the portable device 100 (hereinafter also referred to as a device) may be connected with external devices (not shown) using a mobile communication module 120, a sub-communication module 130, and a connector 165. The "external devices" include other devices such as, mobile phones, smart phones, tablet PCs, and servers.

Referring to FIG. 1, the device 100 includes a touch panel 190, a touch panel controller 195, a display panel 210, and a display controller 215. Also, the device 100 includes a controller 110, a mobile communication module 120, a sub-communication module 130, a multimedia module 140, an image processing module 150, a GPS module 155, an input/output module 160, a sensor module 170, a memory 175, a power supply 180, and a camera module 220.

The above modules may be implemented with software performed by the controller 110, or with hardware corresponding to each module, or a combination of hardware and software.

The sub-communication module 130 includes at least one of a wireless LAN module 131 and a short range communication module 132, and the multimedia module 140 includes at least one of a broadcasting communication module 141, an audio reproducing module 142, and a movie reproducing module 143. The input/output module 160 includes at least one of a plurality of buttons 161, a microphone 162, a speaker 163, a vibration motor 164, a connector 165, a keypad 166, and an earphone connection jack 167.

The controller 110 includes a CPU (not shown), a ROM (not shown) that stores control programs for controlling the device 100, and a RAM (not shown) that stores signals or data input from the outside of the device 100 or that is used as a memory area for operations performed in the device 100. The CPU includes a single core, dual cores, triple cores, or quad cores. The CPU, the ROM and the RAM may be connected with each other through an internal bus.

The controller 110 controls the mobile communication module 120, the sub-communication module 130, the multimedia module 140, the GPS module 155, the input/output module 160, the sensor module 170, the memory 175, the power supply 180, the display controller 215, the display panel 210, the touch panel 190 and the touch panel controller 195.

The mobile communication module 120 allows the device 100 to connect with external devices through mobile communication using at least one or a plurality of antennae (not shown) according to the control of the controller 110. The mobile communication module 120 transmits/receives wireless signals for voice calls, video calls, text messages (SMS) or multimedia messages (MMS) to/from mobile phones (not shown), smart phones (not shown), tablet PCs or other devices (not shown) which have telephone numbers to be entered to the device 100.

The sub-communication module 130 includes at least one of the wireless LAN module 131 and the short range communication module 132. For example, the sub-communication module 130 includes either the wireless LAN module 131 or the short range communication module 132, or may include both of them.

The wireless LAN module 131 is connected with the Internet in the area where wireless Access Points (APs) are installed according to the control of the controller 110. The wireless LAN module 131 supports the wireless LAN standard (IEEE 802.11x) of the Institute of Electrical and Electronics Engineers (IEEE). The short range communication module 132 performs nearby wireless communication between a device 100 and image formation devices according to the control of the controller 110. The local area communication includes Bluetooth, infrared data association (IrDA), or the like.

The device 100 includes at least one of the mobile communication module 120, the wireless LAN module 131, and the short range communication module 132, according to the performance thereof. For example, the device 100 may include a combination of the mobile communication module 120, the wireless LAN module 131, and the short range communication module 132, according to the performance thereof.

The multimedia module 140 includes the broadcasting communication module 141, the audio reproducing module 142, and the movie reproducing module 143. The broadcasting communication module 141 receives broadcasting signals (e.g., TV broadcasting signals, radio broadcasting signals, or data broadcasting signals) and broadcasting added information (e.g., Electric Program Guide (EPS) or Electric Service Guide (ESG)) transmitted from broadcasting stations through a broadcast communication antenna according to the control of the controller 110. The audio reproducing module 142 reproduces digital audio files (e.g., files having file extensions of mp3, wma, ogg, or wav) stored or received, according to the control of the controller 110. The movie reproducing module 143 reproduces digital movie files (e.g., files having file extensions of mpeg, mpg, mp4, avi, mov, or mkv) stored or received according to the control of the controller 110. The movie reproducing module 143 also reproduces digital audio files.

The multimedia module 140 may include only the audio reproducing module 142 and the movie reproducing module 143. Alternatively, the controller 100 may include the audio reproducing module 142 or the movie reproducing module 143 of the multimedia module 140.

The image processing module 150 includes a face detecting unit 151, an eye detecting unit 152, and an object detecting unit 153 for object recognition or facial recognition.

The GPS module 155 receives radio waves from a plurality of GPS satellites and calculates the location of the device 100 using the time of arrival of the radio waves from the GPS satellites to the device 100.

The input/output module 160 includes at least one of a plurality of buttons 161, a microphone 162, a speaker 163, a vibrating motor 164, a connector 165, a keypad 166, and an earphone connection jack 167.

The plurality of buttons 161 are provided on the front, side or rear surfaces of the device 100, and includes at least one of a power/pause button, a volume button, a menu button, a home button, a back button, and a search button.

The microphone 162 receives voices or sounds and generates electrical signals according to the control of the controller 110.

The speaker 163 outputs various sounds corresponding to various signals (e.g., wireless signals, broadcasting signals, digital audio files, digital movie files, photographing, or the like) from the mobile communication module 120, the sub-communication module 130, the multimedia module 140, or cameras 221, 222 and 223 to the outside of the device 100, according to the control of the controller 110. The speaker 163 outputs sounds (e.g., a button sound or a ring back tone corresponding to phone call functions) corresponding to functions performed by the device 100. One or more speakers 163 may be provided at a proper position(s) of a housing of the device 100.

The vibration motor 164 converts an electric signal to a mechanical vibration according to the control of the controller 110. For example, when the device 100 in vibration mode receives a voice call from another device, the vibration motor 164 will operate. One or more vibration motors 164 may be provided in a housing of the device 100. The vibration motor 164 may operate in response to a user's touch gesture on the touch screen 190 and a continuous movement of a touch on the touch screen 190.

The connector 165 is used as an interface to connect the device 100 and external devices or power sources. Data stored in the memory 175 of the device 100 may be transmitted to external devices or data may be received from external devices through wired cables connected with the connector 165 according to the control of the controller 110. Power is supplied from a power source or a battery be charged through wired cables connected with the connector 165.

The keypad 166 receives a key input from a user for controlling the device 100. The keypad 166 includes a physical keypad (not shown) provided in the device 100, or a virtual keypad (not shown) displayed in the touch screen 200. The physical keypad provided in the device 100 may be omitted according to the performance or the structure of the device 100.

The sensor module 170 includes at least one sensor for detecting a state of the device 100. For example, the sensor module 170 may include a proximity sensor (not shown) for detecting proximity of a user to the device or detecting proximity of fingers or pens to a screen, an illuminance sensor (not shown) for detecting the intensity of light around the device 100, or an acceleration sensor (not shown) for detecting motions (e.g., rotation of the device 100, acceleration or vibration acting on the device 100) of the device 100. At least one sensor detects states of the device 100, including a direction and a tilt of the device 100, and generates and transmits signals to the controller 110, corresponding to the detection. Sensors of the sensor module 170 may be added or omitted according to the performance of the device 100.

The power supply 180 supplies power to one or more batteries disposed in a housing of the device 100 according to the control of the controller 110. One or more batteries supplies power to the device 100. In addition, the power supply 180 supplies power input from external power sources to the device 100 through wired cables connected with the connector 165.

The display controller 215 operates the display panel 210 to display various data input from the controller 110, according to the control of the controller 110. The display panel 210 may be panels such as LCDs and AMOLEDs. The display panel 210 displays various operation states of the device 100 and various images according to the performance of applications and services of the device 100.

The touch panel 190 is a transparent switch panel that can receive at least one touch input through various objects, for example, a user's body (e.g., fingers) or a touchable input means, for example, electronic pens (stylus pens). Also, the touch panel 190 can receive a continuous movement input of the at least one touch. The touch panel 190 transmits analog signals corresponding to a continuous movement of an input touch to the touch panel controller 195.

In the present disclosure, touches are not limited to contacts with a user's body or a touchable input means, and may further include non-touching gestures. The distance that the touch panel 190 can detect may be changed depending on the performance and the structure of the device 100 For example, in case of a touch panel 190, such as an EMR type as disclosed below, if an input device (i.e., electronic pen) is positioned within a predetermined distance from the touch panel 190, the touch panel 190 can detect a proximity location or a touch location of the input device although the input device does not directly make contact with the touch panel 190. The distance from the touch panel 190 to the location of the input device may be a range of distance detectable in the touch panel 190.

The touch panel 190 may be implemented using various types of panels, such as, a resistive type, a capacitive type, an infrared type, an Electronic Magnetic Resources (hereinafter referred to as EMR) type, or an acoustic wave type, and may be implemented by a combination thereof.

In the embodiment of the present disclosure, an example of implementation by a combination of a first type of a capacitive type and a second type of an EMR type will be described. The touch panel 190 includes a first touch panel (not shown) and a second touch panel (not shown). The first touch panel is a capacitive type touch panel in which both surfaces of a glass plate are coated with a conductive thin metallic material (e.g., an Indium Tin Oxide (ITO) film) to allow a current to flow on the surfaces of the glass and is further coated with a dielectric substance to store electric charges. When an object touches the surface of the first touch panel, a fixed quantity of electric charges move to the contact point by an electrostatic effect so that the first touch panel recognizes a difference of a current due to the movement of electric charges to thereby detect the touching point. The first touch panel can detect all kinds of touches that generate static electricity, including touches by hands or pens.

The second touch panel is an EMR type touch panel that includes an electromagnetic induction coil sensor having a grid structure in which a plurality of loop coils are disposed in a predetermined first direction and a second direction perpendicular to the first direction, and an electronic signal processing unit to sequentially provide alternating signals of a predetermined frequency to each loop coil of the electromagnetic induction coil sensor. When a pen, including a resonance circuit, remains in the vicinity of the loop coils of the second touch panel, a magnetic field from the corresponding loop coils generates a current in the resonance circuit of the pen on the basis of mutual electromagnetic induction. An induced magnetic field is generated from coils of the resonance circuit in the pen on the basis of the current, and the second touch panel detects the induced magnetic field by the loop coils in a state of receiving signals to thereby recognize a proximity location or a touch point of the pen. The second touch panel detects proximity and a touch of any object that can generate a current based on electromagnetic induction.

The touch panel controller 195 converts analog signals received from the touch panel 190 by detection of a hand touch or a pen touch to digital signals (e.g., X-, Y-, Z-coordinates) to be transmitted to the controller 110. Alternatively, the touch panel controller 195 converts analog signals received from the touch panel 190, by detection of proximity or a touch of a pen, to digital signals to be transmitted to the controller 110. The controller 110 controls the display panel 210 and the touch panel 190 using digital signals received from the touch panel controller 195.

In addition, the touch panel 190 is mounted on the display panel 210 to constitute the touch screen 200. The controller 110 controls the display controller 215 and the touch panel controller 195 to provide user interfaces through the touch screen 200. The touch screen 200 provides user interfaces corresponding to various services (e.g., phone calls, data transmission, broadcasting, and photographing) to a user.

According to an embodiment of the present disclosure, the camera module 220 includes a multifunctional camera 225 that generates 3D images and 2D images, and further may includes another camera 223. According to an embodiment of the present disclosure, the multifunctional camera 225 is disposed on the front surface of the device, i.e., on the surface where the display panel 210 is installed. Further, a third camera 223 may be disposed on the back surface of the device. The multifunctional camera 225 or the third camera 223 may include an auxiliary light source (e.g., a flash(not shown)).

According to the first embodiment of the present disclosure, the multifunctional camera 225 is configured to have two cameras 221 and 222. According to the second embodiment of the present disclosure, the multifunctional camera 225 is configured with one camera.

In a case of a multifunctional camera 225, according to the second embodiment, an image sensor provided in the multifunctional camera 225 is comprised of R, G, B pixels to output colour information and a Z-pixel to output depth information. An example of a configuration of the image sensor is illustrated in FIG. 2.

Figure 2:
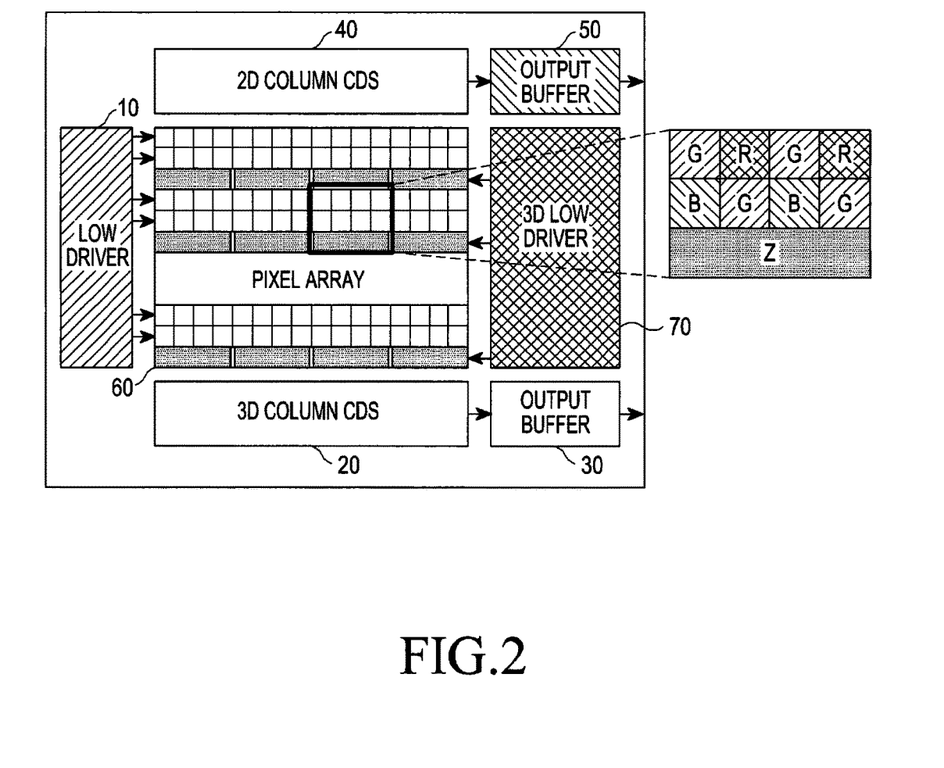
FIG. 2 illustrates a configuration of an image sensor of a multifunctional camera according to an embodiment of the present disclosure.

FIG. 2 illustrates a configuration of an image sensor of a multifunctional camera according to an embodiment of the present disclosure.

Referring to FIG. 2, the image sensor includes a 2D low driver 10, a 3D column CDS 20 and an output buffer 30, 2D column CDS 40 and an output buffer 50, a pixel array 60, and a 3D low driver 70. The image sensor may be, for example, a 1.5 Mpixel RGBZ CMOS image sensor. Accordingly, the multifunctional camera 225 generates 2D images and 3D images.

According to an embodiment of the present disclosure, the controller 110 configures camera operation modes with respect to the multifunctional camera 225, and configures operation parameters according to the camera operation modes in the multifunctional camera 225. The operation parameters are values which determine resolution, exposure time, a gain, a frame ratio of image data generated by photographing.

According to an embodiment of the present disclosure, the camera operation modes is divided into a 3D photographing mode and a 2D photographing mode. The 3D photographing mode is for generating 3D images. When the 3D photographing mode is configured in the multifunctional camera 225, according to the first embodiment of the present disclosure, the first camera 221 and the second camera 222 are simultaneously operated to photograph the subject, so image signals output from each of the cameras 221 and 222 are input to the image processing module 150.

When the 3D photographing mode is configured in the multifunctional camera 225, according to the second embodiment of the present disclosure, a current is applied to predetermined pixels in the pixel array 60 by the 3D low driver 70 to generate 3D images, and pixel values of the corresponding pixels are detected by the 3D column CDS 20 to be input to the image processing module 150.

The 2D photographing mode is for generating 2D images. When the 2D photographing mode is configured in the multifunctional camera 225 according to the first embodiment of the present disclosure, at least one of the first camera 221 and the second camera 222 is operated to input image signals to the image processing module 150. The image processing module 150 generates 2D images using image signals output from at least one of the first camera 221 and the second camera 222.

When the 2D photographing mode is configured in the multifunctional camera 225 according to the second embodiment of the present disclosure, a current is applied to predetermined pixels in the pixel array 60 by the 2D low driver 10 to generate 2D images, and pixel values of the corresponding pixels are detected by the 2D column CDS 40 to be input to the image processing module 150.

The image processing module 150 processes signals input from the camera module 220 to thereby generate 3D images or 2D images under the control of the controller 110, and processes images by a frame to perform object recognition, facial recognition, or eye recognition with respect to the photographed images. Here, object recognition, facial recognition, and eye recognition may be applied to moving images as well as still images. For example, since a moving image is made up of continuous still image frames, a still image frame may be used for facial recognition. According to an embodiment of the present disclosure, the controller 110 configures an eyesight protecting mode in the device 100. The eyesight protecting mode is an operation mode to prevent a user from getting close to the device 100 in less than a predetermined distance.

In configuring the eyesight protecting mode, the controller 110 configures a 3D photographing mode in the multifunctional camera 225. The multifunctional camera 225 operates according to the 3D photographing mode to photograph the subject. Image signals output from the multifunctional camera 225 are input to the image processing module 150.

When the eyesight protecting mode is configured, the image processing module 150 processes image signals input from the multifunctional camera 225 and generates 3D images for recognition to perform object recognition under the control of the controller 110. That is, the image processing module 150 detects at least one object included in the 3D image, and calculates a distance between each detected object and the device 100, i.e., an object distance, by using depth information of the 3D image to output the distance to the controller 110.

In addition, the image processing module 150 performs facial recognition or eye recognition using 2D images corresponding to image signals input from the multifunctional camera 225 under the control of the controller 110. That is, when a facial image is included in the 2D image, the image processing module 150 extracts and recognizes the facial image. When a facial image is not included in the 2D image, the image processing module 150 detects and recognizes eyes from the input image. To this end, the image processing module 150 includes the face detecting unit 151 and an eye detecting unit 152.

Facial recognition is performed by recognition using information on an overall face contour of the subject or by a technology of face extraction using colour and/or texture of facial skin, and templates, based on a facial recognition algorithm provided in the portable terminal. For example, the image processing module 150 studies faces through a multitude of facial images, and detects a facial image from an input image frame using accumulated facial study data.

In addition, eye recognition is performed based on an eye recognition algorithm. In general, a face is detected in advance, and then eyes are detected in a restricted area of the detected facial area. Also, a technology of detecting eyes using a pair of one left eye and one right eye from an input image may be used. Particularly, in the embodiment of the present disclosure, when a face is not detected in an input image, eye detection is performed in the overall area or a predetermined interest area of the input image.

The memory 175 stores signals or data input/output to correspond to operations of the mobile communication module 120, the sub-communication module 130, the multimedia module 140, the GPS module 155, the input/output module 160, the sensor module 170, and the touch screen 200 according to the control of the controller 110. The memory 175 stores control programs for controlling the device 100 or the controller 110 and applications. In addition, the memory 175 stores program data necessary for object recognition, facial recognition and eye recognition according to an embodiment of the present disclosure.

Further, the memory 175 stores hazardous viewing distance information according to an embodiment of the present disclosure. The hazardous viewing distance information refers to a minimum distance that should exist between the display panel 210 of the device 100 and a user for protecting the user's eyesight. The hazardous viewing distance may be referred to as a reference distance. The hazardous viewing distance is determined as a default to be proportional to the size of the whole screen that is actually displayed in the display panel 210 provided in the device 100. Alternatively, a user directly configures the distance according to an embodiment of the present disclosure.

For example, when a user selects a related menu, the controller 110 controls the display controller 215 to allow the display panel 210 to display a user interface by which the user can enter a hazardous viewing distance. Accordingly, a user inputs a hazardous viewing distance as desired, and the controller 110 configures the input distance as the hazardous viewing distance.

Hereinafter, the term "memory" may be interpreted to include the memory 175, a ROM and a RAM in the controller 110, and memory cards (e.g., SD cards, and memory sticks) installed in the device 100. The memory include non-volatile memories, volatile memories, hard disk drives (HDDs), or solid state drives (SSDs).

Figure 3:
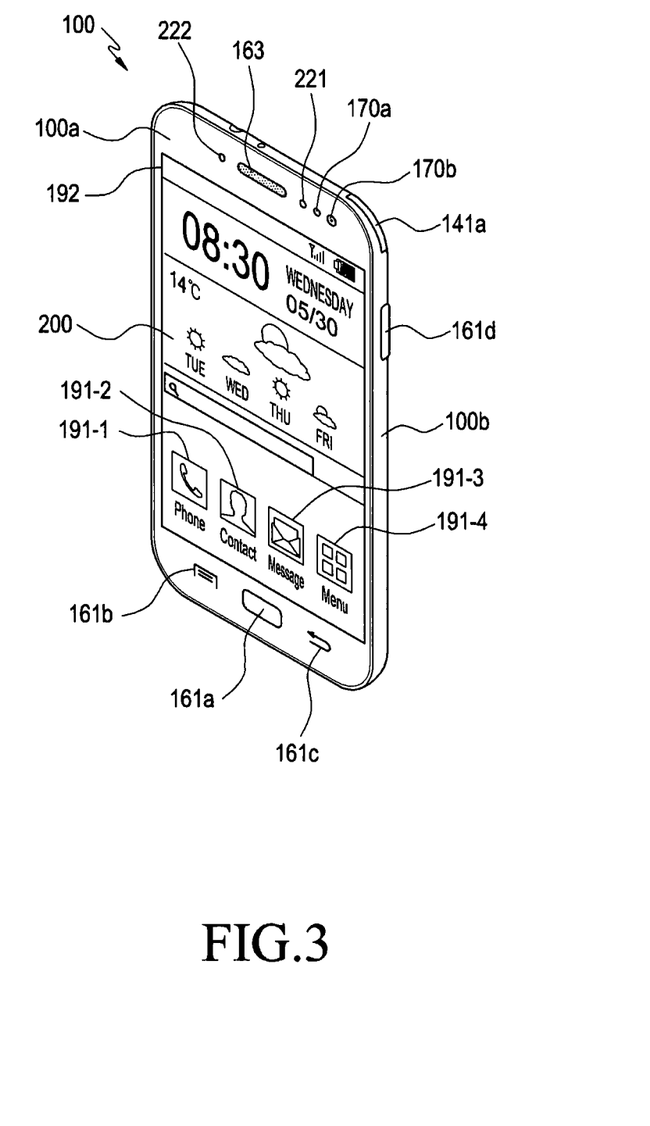
FIG. 3 is a front perspective view of a portable device according to an embodiment of the present disclosure.

FIG. 3 is a front perspective view of a portable device according to an embodiment of the present disclosure.

Referring to FIG. 3, a touch screen 200 is disposed at the center of the front surface 100a of the device 100. The touch screen 200 is formed to be large enough to cover the overall area of the front surface 100a. FIG. 3 shows an example of a main home image displayed in the touch screen 200. The main home image is an initial image displayed in the touch screen 200 when turning the device 100 on. In addition, when the device 100 has separate home images of several pages, the main home image be the first home image among the several pages. Icons 191-1, 191-2 and 191-3 for performing frequently used applications, a main menu conversion key 191-4, time, weather, or the like may be displayed in the home image. The main menu conversion key 191-4 allows a menu image to be displayed in the touch screen 200. Further, a status bar 192 for displaying the status of the device 100, such as the percentage of battery, the intensity of received signals, and the current time may be formed at the upper portion of the touch screen 200.

A home button 161a, a menu button 161b, and a back button 161c may be formed at the bottom of the touch screen 200. The home button 161a allows a main home image to be displayed in the touch screen 200. For example, when the home button 161a is touched while any home image other than the main home image or a menu image are being displayed in the touch screen 200, the main home image is displayed in the touch screen 200. In addition, when the home button 161a is touched while applications are being performed in the touch screen 200, the main home image of FIG. 2 is displayed in the touch screen 200. Further, the home button 161a may be used to display recently used applications or a task manager in the touch screen 200. The menu button 161b provides connection menus to be used in the touch screen 200. The connection menus includes a widget addition menu, a background change menu, a search menu, an editing menu, a setup menu, and the like. The back button 161c displays the image that has been displayed just before the most recently performed image, or terminates the most recently used application. An illuminance sensor 170a, a proximity sensor 170b, and a first camera 221 may be disposed at the edge of the front surface 100a of the device 100. In addition, a second camera 222 be disposed at the right side of a speaker 163. Alternatively, a multifunctional camera 225 configured as in FIG. 2 be disposed at the position of the first camera 221 according to the second embodiment of the present disclosure.

Figure 4:
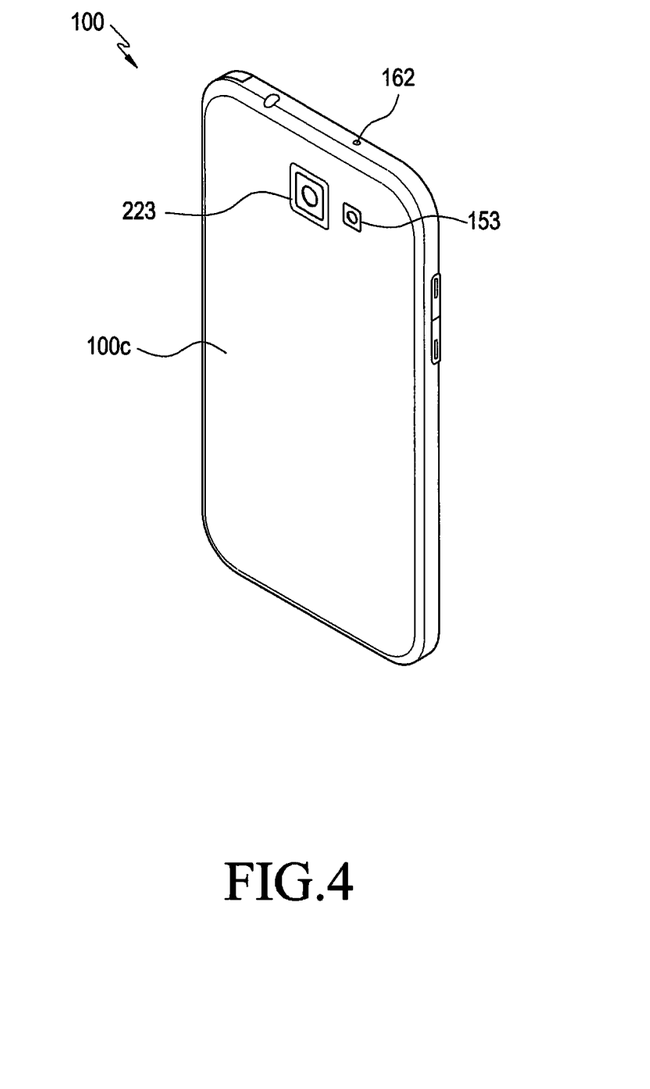
FIG. 4 is a rear perspective view of a portable device according to an embodiment of the present disclosure.

Referring to FIG. 4, on the side of the device 100, a power/reset button 160d, a volume button, a ground wave DMB antenna 141a for receiving a broadcast, one or more microphones 162, and the like may be provided on the side 100b of the device 100. The DMB antenna 141a may be fixed to the device 100, or detachably formed thereon.

FIG. 4 is a rear perspective view of a portable device according to an embodiment of the present disclosure.

Referring to FIG. 4, a third camera 223 and a flash 153 be disposed at the upper portion of the back side 100c of the device 100.

In the device 100 configured as above, the controller 110, i.e., a central processing unit, controls overall operations of the device 100, then detects a distance between a user and the device 100, and controls to warn a user when the user is positioned within the hazardous viewing distance.

According to an embodiment of the present disclosure, when an application that requires a user to view the display panel 210 of the device 100 for more than a certain amount of time, the controller 110 configures an eyesight protecting mode in the device 100. In addition, the controller 110 configures a 3D photographing mode in the multifunctional camera 225. The image processing module 150 outputs an object detected in the 3D image and the corresponding object distance to the controller 110. The controller 110 compares at least one input object distance with the hazardous viewing distance, and if the object distance is less than the hazardous viewing distance, controls the image processing module 150 to perform facial recognition and/or eye recognition using a 2D image in order to determine whether the corresponding object is a human and whether he or she is viewing the display panel 210. The image processing module 150 outputs the results of face detection and/or eye detection to the controller 110, and the controller 110 estimates the size, the location and the angle of the face or the eyes using the results of face detection and/or eye detection. According to this, the controller 110 determine user status information using the results of face detection and/or eye detection. Here, the user status information includes at least one of user's presence, a user's face direction, and a user's face location.

The controller 110 determines a user's presence according to detection or non-detection of a face or eyes from an input image, and determines the direction and the location of a user's face by using an angle and a location of face detection in the upper, lower, left and right directions, for example, 0 degree, 90 degrees, 180 degrees, and 270 degrees in an input image. Furthermore, even though a face is not detected in an input image, the controller 110 may determine the direction and the location of a user's face according to the location and the angle of eyes.

Further, if it is determined that a user is viewing the touch screen 200 of the portable device 100 according to the user status information, the controller 110 generates a predetermined warning notification. Such an operation of the controller 110 will be described with reference to FIG. 5. Hereinafter it is assumed that a multifunctional camera 255 is configured according to the first embodiment of the present disclosure in order to facilitate the understanding of the present disclosure.

According to an embodiment of the present disclosure, when an application requires a user to view the display panel 210 of the device 100 for more than a certain amount of time, the controller 110 of the device 100 configures an eyesight protecting mode in the device 100. The application may be, for example, movie reproducing applications, game applications, web browser applications, e-book applications, or the like.

Figure 5:
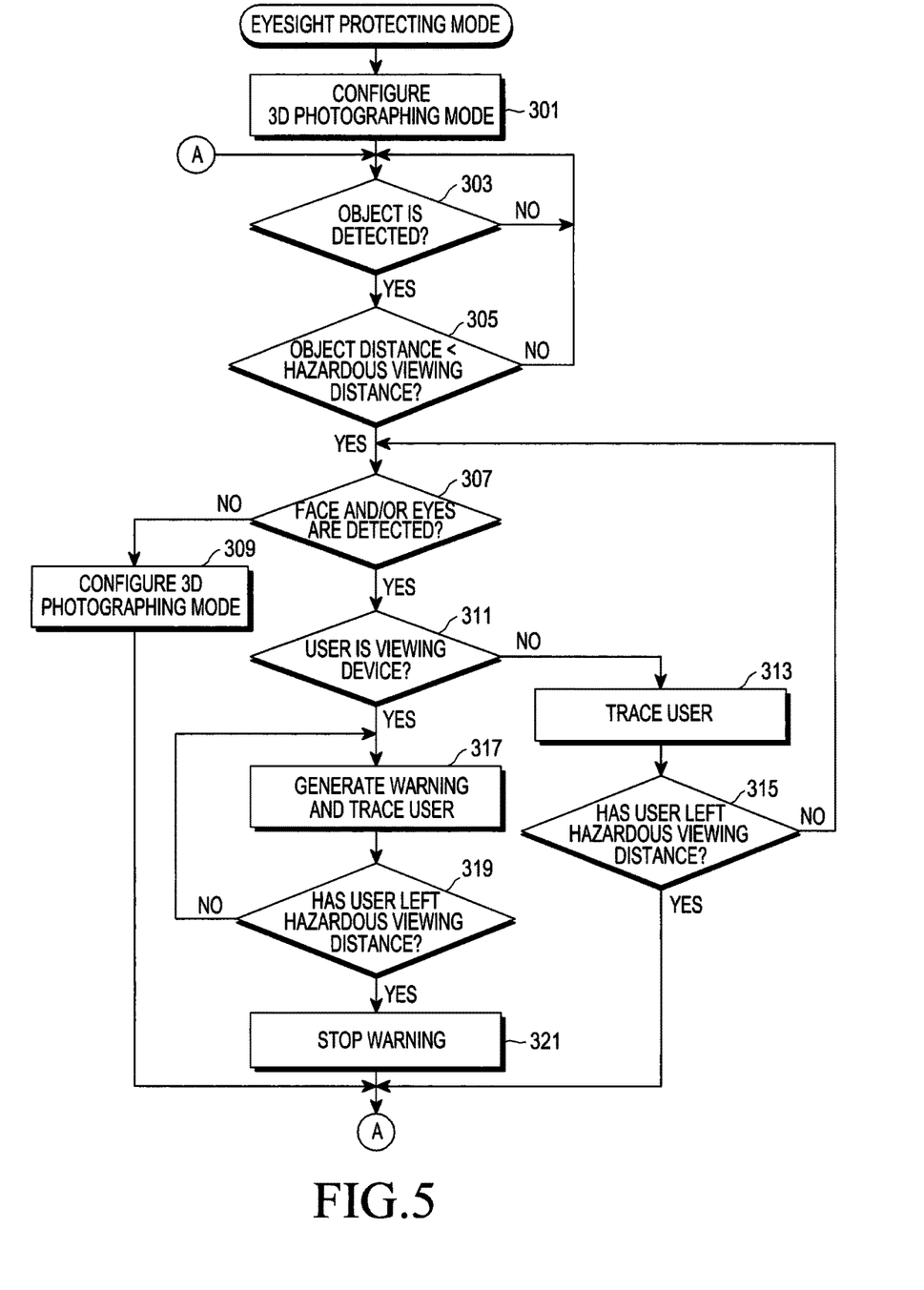
FIGS. 5 and 6 are flowcharts illustrating an operation procedure of a digital device according to an embodiment of the present disclosure.

FIG. 5 is a flowchart illustrating an operation procedure of a digital device according to an embodiment of the present disclosure.

Referring to FIG. 5, with an eyesight protecting mode configured, in step 301, the controller 110 configures a 3D photographing mode in the camera module 220. According to this, the first camera 221 and the second camera 222 of the multifunctional camera 225 in the camera module 220 operate. Also, image signals output from the first camera 221 and the second camera 222 are input to the image processing module 150.

In step 303, the image processing module 150 generates 3D images using the image signals output from the first camera 221 and the second camera 222, and detects at least one object included in the 3D images under the control of the controller 110. If an object is detected, then in step 305, the image processing module 150 calculates an object distance, i.e., a distance between the detected object and the touch screen 200 using depth information of the 3D images under the control of the controller 110, and outputs the same to the controller 110.

Additionally, in step 305, the controller 110 compares the object distance with the hazardous viewing distance, and if the object distance is within the hazardous viewing distance, the sequence proceeds to step 307. That is, if it is determined that an object exists within the hazardous viewing distance, the controller 110 proceeds to step 307 and detects a face and/or eyes using a 2D image in order to identify whether the corresponding object is a human, i.e., a user.

To detect a face and/or eyes in step 307, the image processing module 150 generates a 2D image for facial recognition using image signals input from one of the first camera 221 and the second camera 222, and detects a face and/or eyes from the 2D image under the control of the controller 110.

If a face and/or eyes are not detected, then in step 309, the image processing module 150 reports the same to the controller 110, so the controller 110 excludes the corresponding object from objects to be monitored.

Otherwise, if a face and/or eyes are detected, then in step 311, the image processing module 150 outputs the detection result to the controller 110 and the controller 110 determines whether a user is viewing the device 100 on the basis of the detection result. If it is determined that a user is viewing the device 100, the controller 110 proceeds to step 317 to generate a warning, and continuously traces the movement of the user's face. Next, in step 319, the controller 110 checks whether the user has left the hazardous viewing distance, and if it is determined that the user has left the hazardous viewing distance, the controller 110 proceeds to step 321 to stop the warning and then returns to step 303.

The warning generated in step 317 be, for example, a warning message displayed in the screen. Alternatively, an audio warning be output. Alternatively, a vibration be generated in the device 100.

According to an embodiment of the present disclosure, a plurality of warning levels be configured. The plurality of warning levels be configured by the selection of a user. According to this, the device 100 provides a user with a user interface for guiding the plurality of warning levels and warning types corresponding to the levels. A user may configure a desired warning level through the provided user interface.

The plurality of warning levels is made up of a low level, a medium level, and a high level according to an embodiment of the present disclosure. In the case of a low level warning, a warning message may be displayed at the given place, for example, at the upper and right portion of the screen. Alternatively, the warning may be a vibration in the device 100.

In a case of a medium level warning, a warning message may be displayed, for example, at the center of the screen. Alternatively, a photographed user's image may be displayed at the center of the screen.

In a case of a high level warning, for example, the screen may be turned off. Alternatively, a performed application may be paused. Alternatively, an image may be processed to be displayed in mosaic form.

Returning to FIG. 5, in step 311, if it is determined that a user is not viewing the device, the controller 110 proceeds to step 313 and continues to trace a user. Next, the controller 110 proceeds to step 315 to check whether a user has left the hazardous viewing distance, and if a user has left the hazardous viewing distance, the controller 110 performs initialization and proceeds to step 301. Otherwise, if a user still stays within the hazardous viewing distance, the controller 110 returns to step 307 and continues to check whether a user is viewing the device.

In the above description, it is assumed that the multifunctional camera 255 is configured according to the first embodiment of the present disclosure. If the multifunctional camera 255 is configured according to the second embodiment of the present disclosure, it is obvious that the signal processing procedure, with the exception of the operation control related to the first camera 221 and the second camera 222, is similar to that of the first embodiment.

Figure 6:
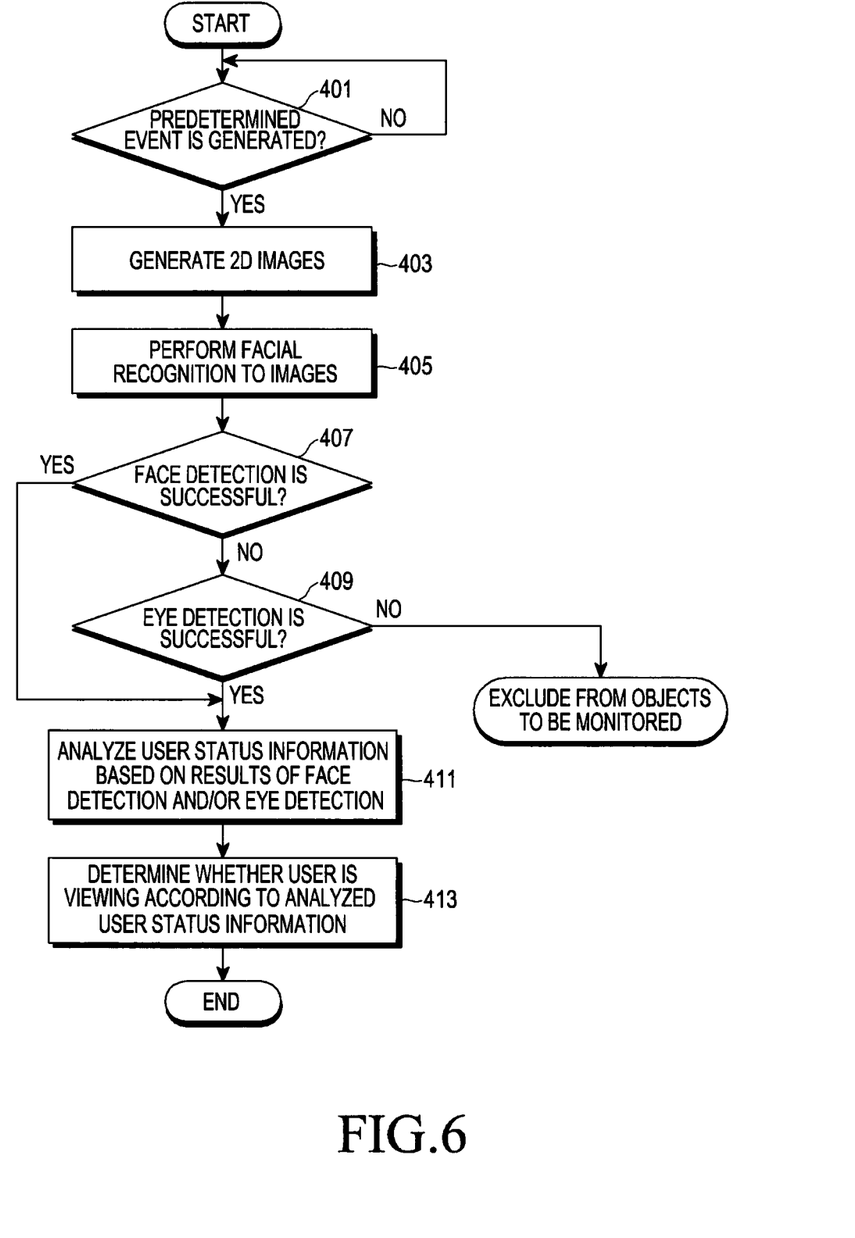
Figure 7:
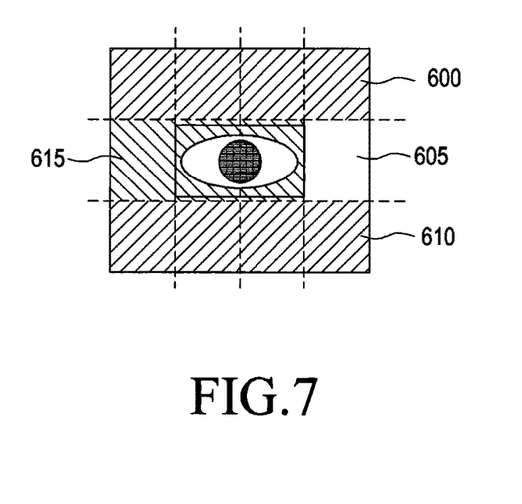
FIG. 7 illustrates an example of a method for detecting an eye candidate area according to an embodiment of the present disclosure.

Detailed operations of the device 100 in steps 307 and 311 of FIG. 5 are illustrated in FIGS. 6 and 7. The operations of detecting a face and/or eyes in 2D images and checking whether a user is viewing the device will be described with reference to FIGS. 6 and 7.

FIG. 6 is a flowchart illustrating an operation procedure of a digital device according to an embodiment of the present disclosure.

Referring FIG. 6, when a predetermined event is generated in step 401, the controller 110 controls the image processing module 150 to generate a 2D image in step 403. Here, the predetermined event is generated by detecting an object that stays in the hazardous viewing distance.

Subsequently, in step 405, the image processing module 150 performs facial recognition with respect to the 2D image. If the image processing module 150 succeeds in detecting a face from an input image by using a facial recognition algorithm in step 407, the sequence proceeds to step 411. Otherwise, if the image processing module 150 fails to detect a face in step 407, the image processing module 150 performs eye recognition to determine success in detecting eyes in step 409. If the detection of eyes is failed, it is determined that a user is not included in the 2D image. If the detection of eyes is successful in step 409, the controller 110 analyzes user status information on the basis of the result of face detection and/or the result of eye detection provided by the image processing module 150 in step 411.

Specifically, if a face or eyes are detected in an input image, the controller 110 determines that a user exists. In addition, the controller 110 checks the result of face detection to determine whether the front of a face is detected or the side of a face rotated left or right at an angle more than a reference value is detected. In addition, in relation to the result of eye detection, the controller 110 checks whether both eyes are detected or whether one eye is detected.

If the front of a face is detected, that is, both eyes are detected, or if the side of a face rotated left or right at an angle less than a reference value is detected, a user status is determined that the user is viewing the device 100 squarely. If the side of a face rotated left or right at an angle more than a reference value is detected, or one eye is detected, or the side of a face rotated left or right at an angle equal to the reference value, a user status is determined that the user is viewing something other than the device 100.

Subsequently, in step 413, the controller 110 determines whether a user is viewing the device 100 according to the analyzed user status information.

Meanwhile, eye detection be performed by the following method in which a technology of eye detection using skin color and eye templates be used. Particularly, the embodiment of the present disclosure provides a method capable of detecting one eye as well as both eyes from an input image.

Specifically, the image processing module 150 performs eye detection in the whole area or a predetermined interest area of an input image. In order to reduce an eye detection speed, eye detection is performed in a partial area on the basis of the location of eye detection obtained in the previous image frame. In addition, eye detection is performed using skin colour, which will be described with reference to FIG. 7.

The image processing module 150 detects one or more eye candidate areas using an eye recognition algorithm. For example, a closed curve that may be an eye candidate is detected through a process of binarizing an input image, or eye candidate areas may be detected using a feature that recognizes eye color. This recognition is based on the fact that most eyes tend to exhibit a strong gray color in an input image even among people not having black pupils. However, while one or more eye candidate areas can be detected using a method by which eye detection is performed in the generally detected face area, using this method, some of the detected eye candidate areas may not be actual eyes.

Accordingly, the embodiment of the present disclosure suggests a method for detecting eyes using skin color in order to remove incorrectly detected eye areas among detected eye candidate areas, when one or more eye candidate areas are detected using an eye recognition algorithm.

To this end, the image processing module 150 obtains a ratio of the skin colored area to the non-skin colored area using Y, Cb and Cr values of one or more detected eye candidate areas, and then performs eye detection using the ratio. Each range of Y, Cb and Cr corresponding to skin color is determined by predetermined critical values of Ty, B1, B2, R1 and R2. The pixel values of Y, Cb and Cr satisfying Equation (1) are determined to correspond to the skin colored area.

$$(Y>Ty) \text{and} (B1<Cb<B2) \text{and} (R1<Cr<R2) \tag{1}$$

The predetermined critical values are vary according to factors such as race and illumination.

FIG. 7 illustrates an example of a method for detecting an eye candidate area according to an embodiment of the present disclosure.

Referring to FIG. 7, an example of calculating a ratio of the skin colored area to the non-skin coloured area is provided. An eye detecting unit 152 of the image processing module 150 detects an eye candidate area, and then divides the detected eye candidate area into three areas 600, 605 and 610 in the horizontal direction and four areas in the vertical direction. Next, the image processing module 150 calculates a skin colour ratio S with respect to the areas 600 and 610, excluding the central area 605, among the horizontally divided three areas 600, 605 and 610, and then calculates a non-skin color ratio NS with respect to hashed areas 615 of ¼~¾ among the vertically divided four areas in the central area 605. Here, the pixel value of skin color is determined by using Y, Cb and Cr values of the detected eye candidate areas, where the formula for determining the skin color is shown above in Equation (1).

According to the above method, when the skin colored ratio S and the non-skin colored ratio NS are obtained, the skin colored ratio S and the non-skin colored ratio NS are compared with predetermined critical values Ts and Tn. If the result of the comparison satisfies the Equation (2), eye detection is determined to be successful, otherwise, if the result of the comparison does not satisfy the Equation (2), eye detection is determined to be incorrect.

$$(S>Ts) \text{and} (NS>Tn) \tag{2}$$

Accordingly, if an eye candidate area among one or more eye candidate areas satisfies the Equation (2), the eye candidate area is finally determined to be an area where eyes are detected. As described above, eye detection can be easily performed for one eye as well as both eyes by using the method for removing incorrectly detected eye candidate areas. The method of dividing the eye candidate area horizontally and vertically is not limited to the example provided in FIG. 7.

For example, the image processing module 150 may collect normal eye images and images which are frequently and incorrectly detected as eyes. The image processing module 150 may use these images to study the images of eyes to more accurately detect eyes images while performing eye detection from an input image.

Additionally, according to an embodiment of the present disclosure, although the whole face is not detected, the presence of a user may be recognized by eye detection, so it can be determined whether a user is viewing the device 100 using the same.

Figure 8:
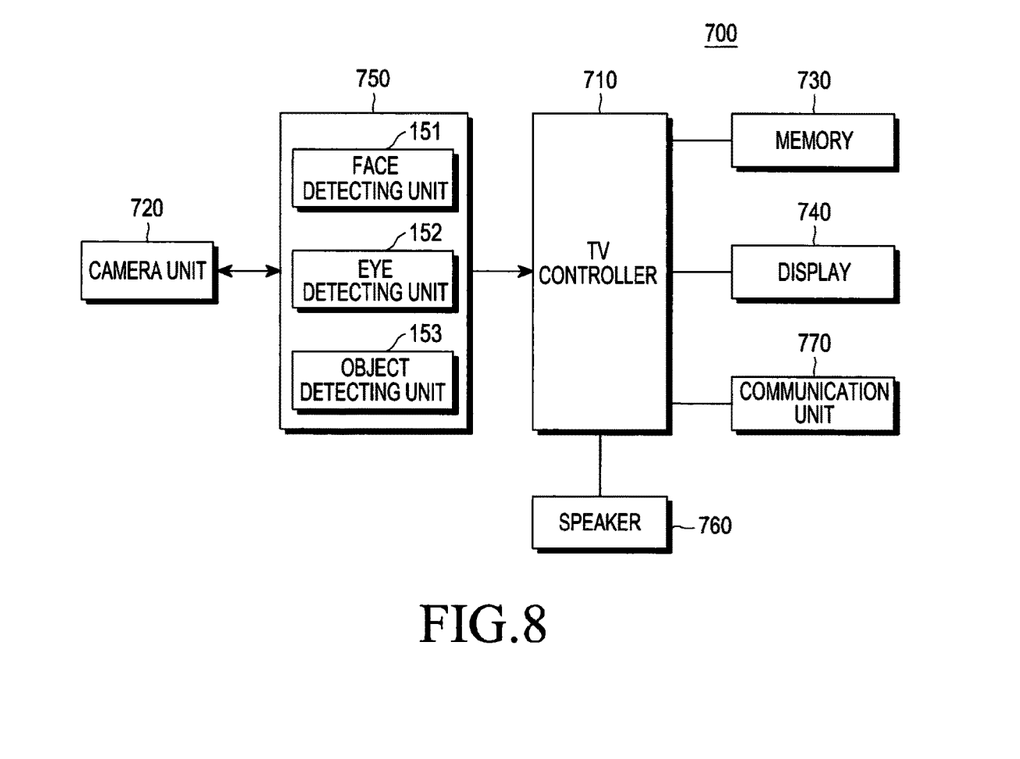
FIG. 8 illustrates a configuration of a digital television according to an embodiment of the present disclosure.

FIG. 8 illustrates a configuration of a digital television according to an embodiment of the present disclosure.

Referring to FIG. 8, an example is provided in which an embodiment of the present disclosure is applied to a television set.

In an embodiment of the present disclosure, a television set 700 includes a TV controller 710, a camera unit 720, an image processing unit 750, a memory 730, a display 740, a communication unit 770, and a speaker 760.

According to an embodiment of the present disclosure, the camera unit 720 includes at least two cameras (not shown). Alternatively, the camera unit 720 is a single camera adopting an image sensor, as configured in FIG. 2. According to an embodiment of the present disclosure, the camera unit 720 is disposed on the front surface, i.e., the surface where the display 740 is installed, of the television set 700.

The TV controller 710 configures camera operation modes of the camera unit 720, and configures operating parameters corresponding to the camera operation modes in each camera unit 720, according to an embodiment of the present disclosure. The operating parameters are values which determine resolution, exposure time, a gain, and a frame ratio of image data generated by photographing.

The camera operation modes are divided into a 3D photographing mode and a 2D photographing mode, according to an embodiment of the present disclosure.

The image processing unit 750 processes signals input from the camera unit 720 to generate 3D images or 2D images under the control of the TV controller 710, and processes images by a frame to perform object recognition, facial recognition or eye recognition, with respect to photographed images. The operation of the image processing unit 750 is similar to that of the above-described image processing module 150. Accordingly, the image processing unit 750 includes a face detecting unit 151, an eye detecting unit 152, and an object detecting unit 153, according to an embodiment of the present disclosure.

According to an embodiment of the present disclosure, the TV controller 710 configures an eyesight protecting mode in the television set 700.

In configuring the eyesight protecting mode, the TV controller 710 configures a 3D photographing mode in the camera unit 720. The camera unit 720 operates in the 3D photographing mode to photograph the subject, and image signals output from the camera unit 720 are input to the image processing unit 750.

When the eyesight protecting mode is configured, the image processing unit 750 performs object recognition under the control of the TV controller 710. That is, the image processing unit 750 detects at least one object included in the 3D image, and calculates a distance between each detected object and the television set 700, i.e., an object distance, by using depth information of the 3D image to output the distance to the TV controller 710.

In addition, the image processing unit 750 performs facial recognition or eye recognition using 2D images corresponding to image signals input from the camera unit 720 under the control of the TV controller 710. That is, when facial images are included in the 2D images, the image processing unit 750 extracts and recognizes facial images. Otherwise when facial images are not included in the 2D images, the image processing unit 750 detects and recognizes eyes from input images. To this end, the image processing unit 750 includes a face detecting unit 151 and an eye detecting unit 152.

The display 740 displays various data input from the TV controller 710, according to the control of the TV controller 710. The display 740 includes display panels such as LCDs and AMOLEDs, and displays various operation states of the television set 700 and various images according to broadcasting services.

The communication unit 770 includes at least one of the wireless LAN module and the short range communication module, and performs communication with external devices under the control of the TV controller 710. For example, the communication unit 770 includes either the wireless LAN module or the short range communication module, or include both of them.

The memory 730 stores signals or data input/output to correspond to operations of various elements according to the control of the TV controller 710. The memory 730 stores control programs for the control of the television set 700 or the TV controller 710 and applications. In addition, the memory 730 stores program data necessary for object recognition, facial recognition and eye recognition, according to an embodiment of the present disclosure.

Further, the memory 730 stores hazardous viewing distance information, according to an embodiment of the present disclosure. The hazardous viewing distance is determined as a default to be proportional to the size of the whole screen that is actually displayed in the display panel provided in the television set 700. Alternatively, a user may directly configure the distance according to an embodiment of the present disclosure.

The operation for protecting a user's eyesight of the television set 700, configured as above, is similar to that of the above-described device 100. That is, the television set 700 operates similarly to the operations illustrated in FIGS. 5 and 6.

However, the television set 700 configures an eyesight protecting mode, not when predetermined applications are performed, but when it is turned on and broadcasting images are displayed. In addition, when it is determined that a user within the hazardous viewing distance is watching the television set 700, the TV controller 710 of the television set 700 provides a warning message and pauses the broadcasting images and converts to a time shift mode. Also, if it is determined that a user has left the hazardous viewing distance, the broadcasting images are displayed again.

Although specific embodiments are described in the above description of the present disclosure, various modifications can be made without departing from the scope of the present disclosure. Accordingly, the scope of the present disclosure shall not be determined by the above-described embodiments, and is to be determined by the following claims and their equivalents.

It will be appreciated that the embodiments of the present disclosure may be implemented in a form of hardware, software, a combination of hardware and software. Any such software may be stored, for example, in a volatile or non-volatile storage device such as a ROM, a memory such as a RAM, a memory chip, a memory device, or an IC, or a optical or magnetic recordable and machine (e.g., computer) readable medium such as a CD, a DVD, a magnetic disk, or a magnetic tape, regardless of its ability to be erased or its ability to be re-recorded. It will be appreciated that a memory, which may be incorporated in a terminal, may be an example of a machine-readable storage medium which is suitable for storing a program or programs including commands to implement the exemplary embodiments of the present disclosure. Accordingly, the present disclosure includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present disclosure appropriately includes equivalents of the program.

What is claimed is:

1. A method for protecting eyesight in an image output digital device, comprising:
    detecting an object in a photographed 3D image, based on a configuration of an eyesight protecting mode;
    detecting a distance between the detected object and the digital device by using depth information of the photographed 3D image;
    when the detected distance is within a reference distance, detecting a face in a photographed 2D image of the object and detecting an eye in the photographed 2D image of the object if the face is not detected in the photographed 2D image of the object, and
    when the face or the eye of a user are detected in the photographed 2D image, determining whether the user remains within the reference distance, based on the results of the face or eye detection,
    determining whether the user is viewing a display panel of the digital device, based on the results of the face or eye detection, and
    when it is determined that the user remains within the reference distance and is viewing the display panel, generating a warning.

2. The method of claim 1, wherein determining whether the user is viewing the display panel comprises:
    when the results of the face or eye detection detect at least one of i) a front of a face, ii) both eyes, and iii) a side of a face rotated left or rotated right at an angle less than a reference value, determining that the user is viewing the display panel; and
    when the results of the face or eye detection detect at least one of i) a side of a face rotated left or rotated right at an angle more than a reference value, ii) the side of the face rotated left or rotated right at the angle that is equal to the reference value, and iii) one eye, determining that the user is not viewing the display panel.

3. The method of claim 1, wherein the reference distance is determined to be proportional to the size of an entire screen that is displayed in the display panel.

4. The method of claim 1, wherein the eyesight protecting mode is configured by performing predetermined applications.

5. The method of claim 1, wherein a warning is generated according to a predetermined warning level among a plurality of warning levels.

6. The method of claim 1, further comprising generating a warning including displaying a warning notification at a predetermined location on the display panel.

7. The method of claim 1, further comprising generating a warning including displaying a photographed user's image at the center of the display panel.

8. The method of claim 1, further comprising generating a warning including turning off the display panel.

9. The method of claim 1, further comprising generating a warning including pausing a currently executed application.

10. The method of claim 1, wherein an image displayed in the display panel is processed with a mosaic effect in the generating a warning.

11. An image output digital device comprising:
    a display panel;
    a camera that is mounted on a same surface as the display panel;
    a processor configured to detect an object in a photographed 3D image, based on configuration of an eyesight protecting mode, to detect a distance between the detected object and the digital device by using depth information of the 3D image, when the detected distance is within a reference distance, to detect a face in a photographed 2D image of the object and detect an eye in the photographed 2D image of the object if the face is not detected in the photographed 2D image of the object, when the face or the eye of a user is detected in the photographed 2D image, to determine whether the user remains within the reference distance, based on the results of the face or eye detection, to determine whether the user is viewing a display panel of the digital device, based on the results of the face or eye detection, and when it is determined that the user remains within the reference distance and is viewing the display panel, to generate a warning.

12. The digital device of claim 11, wherein, when determining whether the user is viewing the display panel, the processor, when the results of the face or eye detection detects at least one of i) a front of a face, ii) both eyes, and iii) a side of a face rotated left or rotated right at an angle less than a reference value, determines that the user is viewing the display panel, and when the results of the face or eyes detect at least one of i) a side of a face rotated left or rotated right at an angle more than a reference value, ii) the side of the face rotated left or rotated right at the angle that is equal to the reference value, and iii) one eye, determines that the user is not viewing the display panel.

13. The digital device of claim 11, wherein the reference distance is determined to be proportional to the size of an entire screen that is displayed in the display panel.

14. The digital device of claim 11, wherein the eyesight protecting mode is configured by performing predetermined applications.

15. The digital device of claim 11, wherein the processor generates a warning according to a predetermined warning level among a plurality of warning levels.

16. The digital device of claim 11, wherein, when generating a warning, the processor controls to display a warning notification at a predetermined location on the display panel.

17. The digital device of claim 11, wherein, when generating a warning, the processor controls to display a photographed user's image at the center of the display panel.

18. The digital device of claim 11, wherein, when generating a warning, the processor turns off the display panel.

19. The digital device of claim 11, wherein, when generating a warning, the processor pauses a currently executed application.

20. The digital device of claim 11, wherein the processor processes an image displayed in the display panel with a mosaic effect to generate a warning.

* * * * *